United States Patent [19]
Spanoudis

[11] 3,982,584
[45] Sept. 28, 1976

[54] GAS TEMPERATURE AND FLOW CONTROL SYSTEM

[75] Inventor: Louis Spanoudis, Toledo, Ohio

[73] Assignee: Owens-Illinois, Inc., Toledo, Ohio

[22] Filed: Apr. 23, 1975

[21] Appl. No.: 571,037

[52] U.S. Cl. .................................... 165/42; 165/48; 165/61; 312/236

[51] Int. Cl.[2] .......................................... F25B 29/00

[58] Field of Search ..................... 165/2, 42, 48, 61; 312/236

[56] References Cited

UNITED STATES PATENTS

| | | | |
|---|---|---|---|
| 3,042,384 | 7/1962 | Bauman | 165/42 |
| 3,275,393 | 9/1966 | Stentz et al. | 312/236 |
| 3,311,434 | 3/1967 | Dyer et al. | 312/236 |
| 3,608,627 | 9/1971 | Shevlin | 165/2 |
| 3,797,563 | 3/1974 | Hoffmann et al. | 165/48 |
| 3,886,346 | 5/1975 | Meyers | 165/48 |
| 3,908,749 | 9/1975 | Williams | 165/2 |

*Primary Examiner*—Carlton R. Croyle
*Assistant Examiner*—Robert E. Garrett
*Attorney, Agent, or Firm*—David R. Birchall; Edward J. Holler; Steve M. McLary

[57] ABSTRACT

Apparatus for the control of flow and temperature of a working gas to allow temperature control of meal components carried by a two-compartment tray. The components of a meal are carried in an insulated, two-compartment tray. Both compartments are cooled by refrigerated air introduced thereto until a short time before serving. Then, hot air is introduced to one compartment to heat the contents thereof while the cool air flow to the other compartment is maintained. A flow distributor has two inlet and two outlet manifolds. One inlet and outlet manifold pair always receive cool air for supply to one compartment of the tray. The other inlet and outlet manifold pair can selectively receive either cool or hot air to allow heating or cooling of the contents of the other tray compartment. The trays are held in a uniform vertical array. Nozzles are connected to the air flow within the manifolds. The nozzles plug into the tray compartments to allow the air flow within the manifolds to control the temperature of the tray contents. Valves may be used to keep closed nozzles which do not have a tray presented to their position.

11 Claims, 10 Drawing Figures

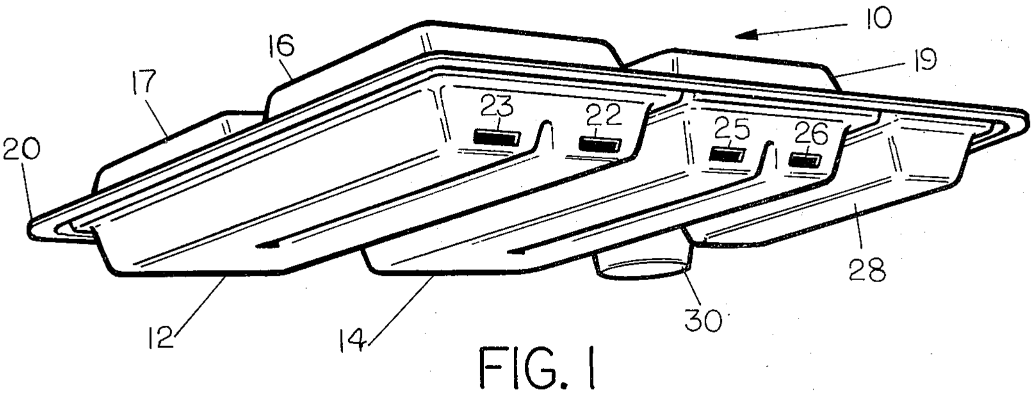
FIG. 1
FIG. 4
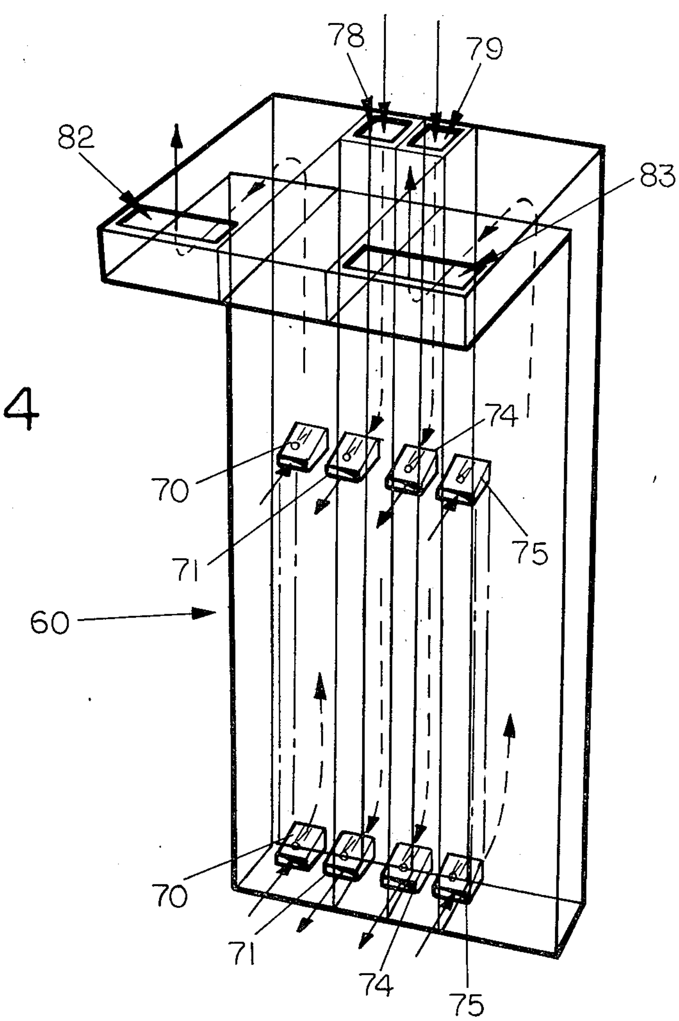

GAS TEMPERATURE AND FLOW CONTROL SYSTEM

BACKGROUND OF THE INVENTION

This invention generally relates to the control of temperature and flow distribution of gas streams. More particularly, this invention relates to an apparatus for selectively heating and cooling portions of pre-plated meals carried in dual compartment trays. Specifically, this invention relates to an apparatus for supplying an air flow which will permit selective re-thermalization of certain meal components carried by the tray while other meal components are kept chilled.

The need for a food service system which will allow preparation of meals long before they are needed, hold the meals at a safe temperature, and then reheat portions of the meal for serving has been well recognized. The prior art shows many attempts to develop such systems. Most of these systems presented flaws in either feasibility or expense. For example, both micro-waves and infra-red lamps have been used to re-heat meal portions. These systems were unable to maintain cold meal components on the same tray at the desired cooler serving temperature. This usually required assembly of the meal by adding cold components from a separate refrigerated holding unit.

In my co-pending application, U.S. Ser. No. 480,946 filed June 19, 1974, I disclosed a two-compartment tray for holding cold meal components in one compartment and hot meal components in a second compartment. Prior to serving, both compartments were furnished with cold air to keep the meal portions at a safe temperature. Then, prior to serving, the meal portions to be served hot were re-thermalized by blowing hot air into the compartment carrying these components. The flow of cold air to the other compartment was maintained so that these meal components could be served chilled as required. The present invention is concerned with a specific apparatus for furnishing the desired air flow to the appropriate tray compartment. A refrigeration unit and heating unit may be used to feed two pairs of inlet and outlet manifolds. Nozzles connect the trays to the manifolds. A suitable control means then directs the hot or cold air to the compartment of the tray which carries the metal portions which are to be served hot. Examples of the prior art may be seen in U.S. Pat. Nos. 3,608,770 and 3,784,787.

SUMMARY OF THE INVENTION

My invention is basically a gas temperature therefore flow control system with specific application and the selective heating and/or cooling of the compartments of a compartmented tray. The system includes a refrigeration means for cooling a flow of gas passing therethrough to present a flow of refrigerated gas. A heating means is provided for heating a flow of gas passing therethrough to present a flow of heated gas. A flow distributor has a first inlet manifold and a first outlet manifold connected to the refrigeration means. The flow distributor also has a second inlet manifold and a second outlet manifold. A flow control means will allow selective connection of either the refrigeration means or the heating means to the second inlet manifold and the second outlet manifold.

BRIEF DESCRIPTION OF THE DRAWINGS

FIG. 1 is a perspective view, taken from the bottom, of a food service tray useable with the present invention;

FIG. 4 is a perspective view of a flow distributor to be used with the meal-holding unit of FIG. 3;

DETAILED DESCRIPTION OF THE DRAWINGS

Figure 2:
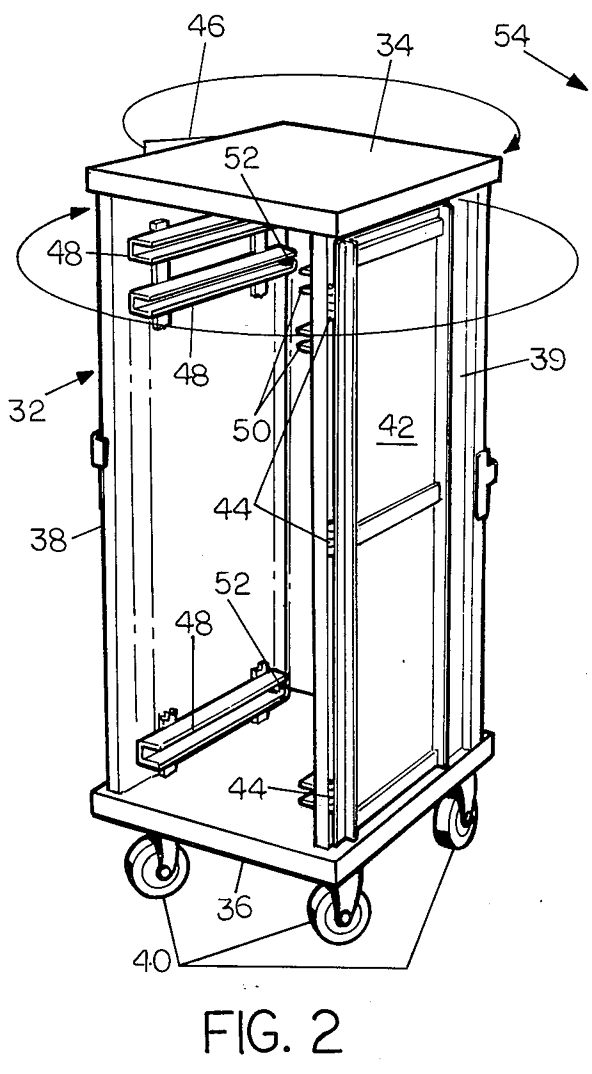
FIG. 2 is a perspective view of a transport cart for storage and movement of the trays of FIG. 1.

In a co-pending U.S. patent application, Ser. No. 480,946, filed June 19, 1974, I disclosed a specific type of tray for holding pre-plated meals over a relatively long period of time. In that application, I cited a relatively simple system for maintaining these meals at a suitable temperature over this extended period of time and then re-heating selected portions of the meals immediately prior to serving. The present application is concerned with an improved and sophisticated cart system for providing these cooling and heating functions for the trays of my co-pending application. A tray 10, as seen in FIG. 1, generally conforms to that disclosed in the previously mentioned co-pending patent application. This tray includes at least two separated and individual compartments 12 and 14. The compartments 12 and 14 are preferably molded as an integral unit with the entire tray 10, with the tray 10 being formed from a thermally insulating material such as foamed polystyrene. One of the compartments, for example 14, is designed to maintain any plates of food placed therein cold from the time of portioning of the meal components until the time the meal is served. The other compartment, for example compartment 12, is designed to allow the contents of this compartment to be cooled until a short time before the meal is to be served. Then, heated air may be introduced into the compartment 12 and the contents thereof heated for serving at a desirable temperature. By maintaining the compartments 12 and 14 completely separated from one another it is possible to cool the contents of the compartment 14 while simultaneously heating the contents of the compartment 12. As seen in FIG. 1, the compartment 12 contains two food dishes whose lids 16 and 17 are visible in FIG. 1. The lids 16 and 17 are also preferably of a thermally insulating material so that the contents of the food plates under the lids 16 and 17 are not affected by the ambient conditions but rather are affected only by air introduced to compartment 12. The dishes themselves are preferably of a thermally conductive material. Similarly, the compartment 14 also contains two food dishes, a lid 19 covering one of these dishes being visible in FIG. 1. The tray 10 also includes a flange portion 20 which extends around its entire peripheral circumference and provides a means for supporting the tray 10 on storage racks. The compartment 12 has a flow inlet slot 22 and a flow outlet slot 23. Cool air is introduced into the slot 22 and exits from the slot 23, the flow being directed within the compartment 12 in a manner described in my co-pending application. Similarly, the compartment 14 has a flow inlet slot 25 and a flow outlet slot 26. The tray 10 may also include a recessed compartment 28 for silverware and a compartment 30 for a beverage container.

FIG. 2 illustrates a transport cart which may be used for carrying a plurality of trays 10 from a remote central commissary to the point of use. One example of the use of such a system is in hospitals where the kitchen or commissary area may be a significant distance away from the patient rooms where the meals are to be served. Significant economies of operation may be achieved if numerous meals may be prepared ahead of time and then transported to the patient room for eventual use. To this end, a cart 32 may be loaded with a plurality of trays 10 which contain meals to be served to patients in the hospital. It should be noted that the example of a hospital commissary is strictly by way of one illustration of the utility of this invention, and the total utilization of this invention is in no way limited strictly to hospitals. The cart 32 may be a totally enclosed unit which includes a top portion 34, a base member 36 and vertically extending sidewalls 38 and 39 which tie together the top 34 and the base 36. To provide mobility for the cart 32, the base member 36 has attached to it wheels or casters 40. A forward door 42 is connected to the sidewall 39 by hinges 44. In FIG. 2, the forward door 42 is shown completely open and folded against the sidewall 39. The cart 32 also includes a rear door 46 which is shown as being partially open in FIG. 2, the rear door 46 being hinged to the sidewall panel 38 and designed to open fully and fold against the sidewall panel 38 as does the forward door 42 against the sidewall panel 39. Connected to the interior of the sidewall member 38 are a plurality of tray-support members 48. The tray-support members 48 are uniformly vertically spaced apart along substantially the entire height of the sidewall panel 38. A corresponding plurality of tray-support members 50 are positioned on the interior of the sidewall 39 and are likewise uniformly vertically spaced apart. The tray-support members 48 and 50 are so positioned that they form mutually opposed pairs on the sidewall panels 38 and 39 so that a tray 10 may be supported by its flange 20 resting on or in a pair of tray-support members 48 and 50. It is therefore clear that a plurality of trays 10 may be supported by the tray-support members 48 and 50 within the interior of the transport cart 32 in a vertically stacked array. The tray-support members 48 and 50 are shown in FIG. 2 as being generally U-shaped channel members, but this is not a critical requirement and these support members 48 and 50 may be simple, flat, L-shaped brackets which would still serve to support the trays 10 by their flanges 20. The tray-support members 48 and 50 all have at their ends adjacent to the rear door 46 stop members 52. The stop members 52 are designed to serve two important functions. First of all, the stop members 52 allow the trays 10 to be slid into the cart 32 without danger of pushing the tray 10 completely through the cart 32 and out the opening left by the rear door 46 being opened. In addition, the stop members 52 accurately position the trays 10 for interconnection with a heating and cooling unit to be described with respect to FIG. 3. If desired, all of the cart 32 may be heavily insulated so that any trays 10 which are placed within the cart 32 with the doors 42 and 46 closed may be transported an appreciable distance without significant effect upon the contents carried by the tray 10 by ambient atmospheric conditions.

Figure 3:
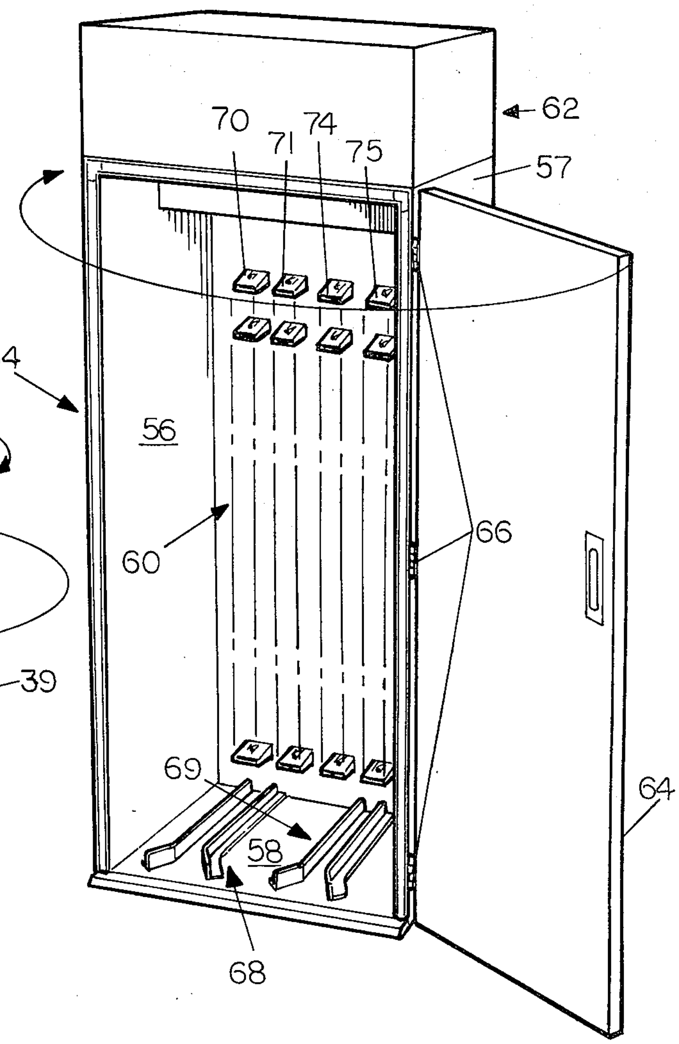
FIG. 3 is a perspective view of a meal-holding unit of the present invention.

FIG. 3 illustrates a meal-holding unit 54 which is preferably located in an area adjacent to that where the meals carried by the cart 32 will be used. The meal-holding unit 54 is a box-like structure with vertical sidewalls 56 and 57 and a bottom wall 58. The meal-holding unit 54 also includes a back wall and a top wall which are not visible in FIG. 3. The back wall is covered by a flow distributor 60 which will be described in more detail with respect to FIG. 4. The top wall of the meal-holding unit 54 is covered by an equipment module 62 which contains heating and cooling equipment that will be described in more detail later. A door 64 is attached to the sidewall 57 by hinges 66 and opens to allow entry of the cart 32 into the interior of the meal-holding unit 54. A pair of tracks 68 and 69 are mounted on the wall 58 of the meal-holding unit 54 to guide the wheels 40 of the transport cart 32 to ensure proper orientation of the transport cart 32 within the meal-holding unit 54. The dimensions of the meal-holding unit 54 should be sufficient to allow complete entry of the cart 32 into its interior and still allow the door 64 to be closed securely. If desired, the meal-holding unit 54 may be insulated to minimize any effects of the outside environment on the cart 32 which may be within the meal-holding unit 54. In fact, it would be possible to refrigerate the entire meal-holding unit 54 to keep the meals on the trays 10 cool. Then, hot air would be introduced only into those compartments of the trays 10 which contained meal components to be served hot just prior to serving the meals. While this approach would simplify the manifolding arrangement somewhat, it would require better insulation for the meal-holding unit 54. The flow distributor 60 includes two rows of pairs of air nozzles. The air nozzles in the first row are designated as 70 and 71 while the nozzles in the second row are designated as 74 and 75. The nozzles 70, 71, 74 and 75 extend in a spaced array throughout substantially the entire vertical height of the flow distributor 60 and are positioned to generally correspond in vertical elevation with the tray-support members 48 and 50 carried by the transport cart 32. As will be shown later, the nozzles 70 and 71 will engage the slots 25 and 26 in the compartment 14 of the tray 10 while the nozzles 74 and 75 will engage the slots 22 and 23 in the compartment 12 of the tray 10. This engagement of the nozzles with the slots enables heated or cooled air to be directly introduced into any one of the trays that are so engaged.

The flow distributor 60 is seen in FIG. 4 removed from the interior of the meal-holding unit 54. There are two air inlet manifolds 78 and 79. The air inlet manifold 78 is connected to each of the nozzles 71 in one of the rows of nozzles. The air inlet manifold 79 is connected to the nozzle 74 in the other row of nozzles. The air inlet manifolds 78 and 79 are closed at their lower end and open at their upper ends to connect with the equipment carried in the equipment module 62 mounted atop the meal-holding unit 54. The inlet manifolds 78 and 79 are substantially co-extensive with the height of the flow distributor 60. There are also provided two air outlet manifolds 82 and 83 which are parallel to the inlet manifolds 78 and 79. The outlet manifold 82 is connected to the nozzles 70 while the outlet manifold 83 is connected to the nozzles 75. It may be seen then that air may enter a tray 10 through the nozzle 71 as furnished by the inlet manifold 78 and exit from tray 10 into the nozzle 70 and thence be returned to the equipment module 62 through the air outlet manifold 82. It should be apparent that the specific configuration of the flow distributor 60 shown in FIG. 4 is simply by way of example of one possible means of making connections between inlet and outlet manifold passages to furnish air to the trays 10 and remove the air from the trays 10. In addition, the mounting of the equipment module 62 on top of the meal-holding unit 54 is an arbitrary choice, and it is obvious that the equipment module 62 could be mounted beside this unit, under it or in fact the heated or cooled air needed could be supplied from a central source of heated or cooled air. It is also to be noted that the working fluid used and discussed throughout as an example is air, but any gas could be used as the working fluid. Under special circumstances it might be desirable to use an inert gas such as nitrogen for the working gas, but this would require a system which is substantially more gas-tight than the system here described to prevent loss of the working gas. Thus, air has proven to be the most economical and feasible gas to be used and will be discussed as a specific example. The flow distributor 60 itself is generally L-shaped, with the foot of the L containing an extension portion of the outlet manifold 82 and 83 to allow presenting the fluid flow from these manifolds to a desired location with respect to the equipment module 62.

Figure 5:
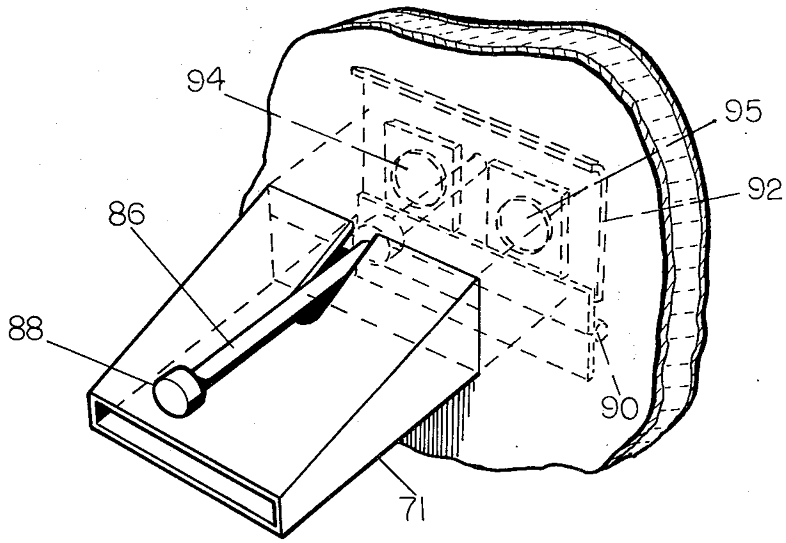
FIG. 5 is a perspective view, on an enlarged scale, of one of the nozzles from the flow distributor of FIG. 4.
Figure 6:
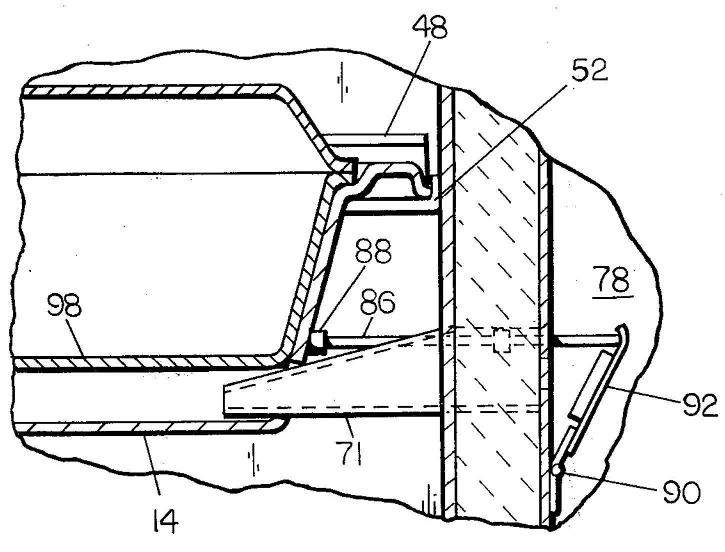
FIG. 6 is a side-elevational view, partially in cross-section, illustrating the engagement of a tray with one of the flow distributor nozzles and the operation of a valve for the nozzle.

FIGS. 5 and 6 illustrate a valving arrangement for the nozzles 70, 71, 74 and 75 which may be used. The valving arrangement which is illustrated in FIGS. 5 and 6 is an optional arrangement and is designed to be utilized under conditions where all of the space within the transport cart 32 is not filled with trays 10. That is, it is possible that a location from which meals are to be served would not generate sufficient volume of meals to require use of the total number of trays 10 which may be carried by the cart 32. In this case then, there would be blanks or empty tray-support members 48 and 50. If a valving arrangement were not provided for the nozzles 70, 71, 74 and 75, the air would escape and thus significantly deteriorate the performance of the total system. It is therefore preferable that the nozzles be kept closed unless a tray 10 is in position to accept the air flow from the nozzles. Another possibility would be to use blank or empty trays in locations where a tray is not required to carry a meal. This is a somewhat simpler solution and does not require the valving arrangement shown in FIGS. 5 and 6, but does require some thought in the loading of the transport cart 32. This situation requires that a person loading the transport cart 32 be certain to insert blank or empty trays 10 in those locations where a tray 10 with a meal contained therein is not provided. In FIG. 5, a typical one of the nozzles designed as nozzle 71 has been chosen to illustrate the valving arrangement. The nozzle 71 has a notch cut in its upper region which allows a push rod 86 to pass through this notched portion. The push rod 86 has on its extending end a bumper 88 which is positioned adjacent to the area which will be occupied by the tray 10. Behind the nozzle 71 and located in the air inlet manifold 78 is a spring-loaded hinge 90. The spring-loaded hinge 90 has attached to it a flapper valve 92 which is normally urged into a sealed position against two openings 94 and 95 formed in the wall of the air inlet manifold 78 and thereby communicating with the nozzle 71. Under these conditions, the flapper valve 92 is snapped tight against the openings 94 and 95 and thus prevents escape of any air from the air inlet manifold 78. The push rod 86 continues through the body or the interior of the nozzle 71 and is in contact with the flapper valve at the end opposite the bumper 88. FIG. 6 then illustrates the situation which occurs when a transport cart 32 is inserted into the meal-holding unit 54 to its full depth. As the cart 32 is pushed inwardly, the bumper 88 will contact a portion of the compartment 14 just above the flow inlet slot 25 formed therein. The nozzle 71 will enter the flow inlet slot 25 and in so doing will cause the push rod 86 to be pushed to the rear toward the air inlet manifold 78. This motion will then overcome the bias of the spring-loaded hinge 90 and will cause the flapper valve 92 to open. This will then allow any air contained within the air inlet manifold 78 to flow through the openings 94 and 95 and into the nozzle 71, thus into the compartment 14. Also note that in FIG. 6, a dish 98 which contains the meal contents is also shown in cross-section inserted into the compartment 14. The stop member 52 and the tray-support member 48 are also visible in FIG. 6.

Figure 7:
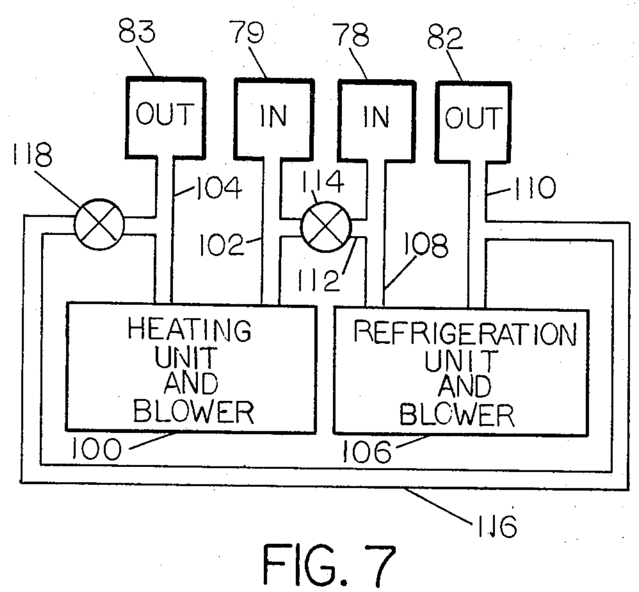
FIG. 7 is a schematic representation of a flow control system for the present invention.

FIG. 7 shows one possible configuration, in a schematic manner, of how the flow distributor 60 may be connected to provide both heating and cooling functions to a tray 10 which is being held in the meal-holding unit 54. A heating unit and blower 100 is connected to the air inlet manifold 79 through a pipeline 102 and is likewise connected to the air outlet manifold 83 by a pipeline 104. A refrigeration unit and blower 106 is connected to the air inlet manifold 78 by a pipeline 108 and is connected to the air outlet manifold 82 by a pipeline 110. A cross-connecting pipeline 112 connects the pipelines 102 and 108. A valve 114 is inserted into the pipeline 112 to selectively connect or disconnect the pipelines 102 and 108. A second cross-connecting pipeline 116 connects the pipelines 104 and 110. A valve 118 allows selective connection or disconnection of the pipelines 104 and 110. In operation, when the transport cart 32 carrying trays 10 has been placed in position in ths meal-holding unit 54, the nozzles 70, 71, 74 and 75 will be engaged in the slots in the trays 10. At this time it may be assumed that all of the contents of the trays 10 should be kept cool until shortly before the meals are to be served. In this case then, the refrigeration unit and blower 106 would be turned on. The valves 114 and 118 would be opened and the heating unit and blower 100 would be kept inactive. The air flow then would be through the pipeline 108 and into the air inlet manifold 78 which will then furnish chilled air to the compartment 14 of the tray 10. The same chilled air would then pass through the opened valve 114 and the cross-connecting pipeline 112 and through the pipeline 102 into the air inlet manifold 79 and from there into the compartment 12 of the trays 10. It should therefore be clear that all of the contents of the tray 10 would be subjected to cool air at this time. The cool air would then be removed from the air outlet manifolds 83 and 82 and conducted through the pipelines 104, 116 and 110 back through the refrigeration unit and blower 106 for recooling and furnishing to the trays 10 again. Since the valve 118 is opened, this path of air flow is available. At a time selected before the meal is to be served, it is assumed that those portions of the meal which were placed in the compartment 12 are to be served heated while the remainder of the meal is to be made up of food items which should be served cold. At this time therefore the valves 114 and 118 would be closed either automatically by a cycle timer or by an operator. In addition, the heating unit and blower 100 would be activated to provide a source of hot air. The air flow at this time then would be a flow of cool air along the pipeline 108 into the air inlet manifold 78 which would then continue to furnish cool air to those meal components carried in the compartment 14. However, the heating unit and blower 100 would now be furnishing hot air along the pipeline 102 into the air inlet manifold 79 which would therefore furnish heated air to the compartment 12 of the tray 10 thereby causing heating of those meal components carried in this particular compartment of the tray 10. The valves 114 and 118 being closed will block the previous interchange of flows of air. In all of the examples given of a flow control means for selectively furnishing cooled or heated air to the inlet manifold 79 and outlet manifold 83, it should be clear that ducts such as 102, 104, 108 and 110 could be eliminated by having direct connections from the cool and hot air sources into the flow distributor 60. The control function really requires only the cross-connecting pipelines 112 and 116 and the valves 114 and 110.

Figure 8:
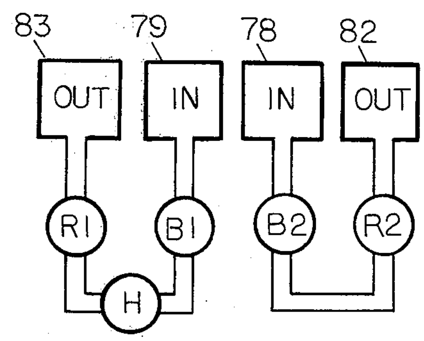
FIG. 8 is a schematic representation of a modified flow control system for the present invention.

FIG. 8 illustrates a modification of the air flow pattern shown in FIG. 7. In this case, the air inlet manifolds 78 and 79 have provided separate refrigeration units designated as R1 and R2. In this situation, when it is desired to maintain all of the contents of the tray 10 chilled, the refrigeration units R1 and R2 would both be turned on. Blowers B1 and B2 would then circulate the cooled air through both the compartments 12 and 14 in a manner similar to that described with respect to FIG. 7. When it was then desired to heat the contents of the compartment 12, the refrigeration unit R1 would be turned off and a heating unit H would be turned on leaving the blower B1 still operating. This then would furnish hot air to the compartment 12 and thereby cause heating of the meal components carried in this portion of the tray 10.

Figure 9:
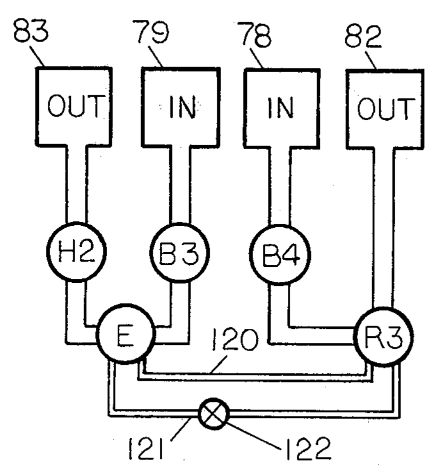
FIG. 9 is a schematic representation of another modified flow control system for the present invention.

FIG. 9 shows a still further modification of the heating and cooling system shown in FIGS. 7 and 8. In FIG. 9, there is only a single complete refrigeration unit R3 provided and this unit is connected to the air inlet manifold 78 and air outlet manifold 82. The refrigeration unit R3 is of the type in which a working fluid passes through an evaporator coil over which the gas to be cooled passes. The working fluid absorbs energy from the gas, thus cooling the gas. However, on the side connected to the air inlet manifold 79 and air outlet manifold 83, an evaporator unit E is provided. The evaporator unit E is connected to the refrigeration unit R3 by pipelines 120 and 121 which carry refrigeration or working fluid to and from the evaporator E. A valve 122 allows selective circulation of the refrigerant through the evaporator E. Under the conditions where it is desired to cool the contents of the compartments 12 and 14, the valve 122 would be opened which would allow the refrigerant to flow to and from the evaporator E thereby providing a source of chilled air which can be circulated by a blower B3 connected into the air inlet manifold 79. At the same time, of course, the refrigeration unit R3 is also furnishing cooled air to the air inlet manifold 78 with circulation provided for by a blower B4. When it is desired to heat that portion of the meal carried in the compartment 12, the valve 122 is closed and a heater H2 is turned on. With the blower B3 continuing to run, the heater H2 will then present a source of heated air which will heat the contents of the compartment 12. Closing of the valve 122 will prevent any further flow of refrigerant to the evaporator E while the refrigeration unit R3 may continue to run and still furnish cool air to the compartment 14 of the tray 10.

Figure 10:
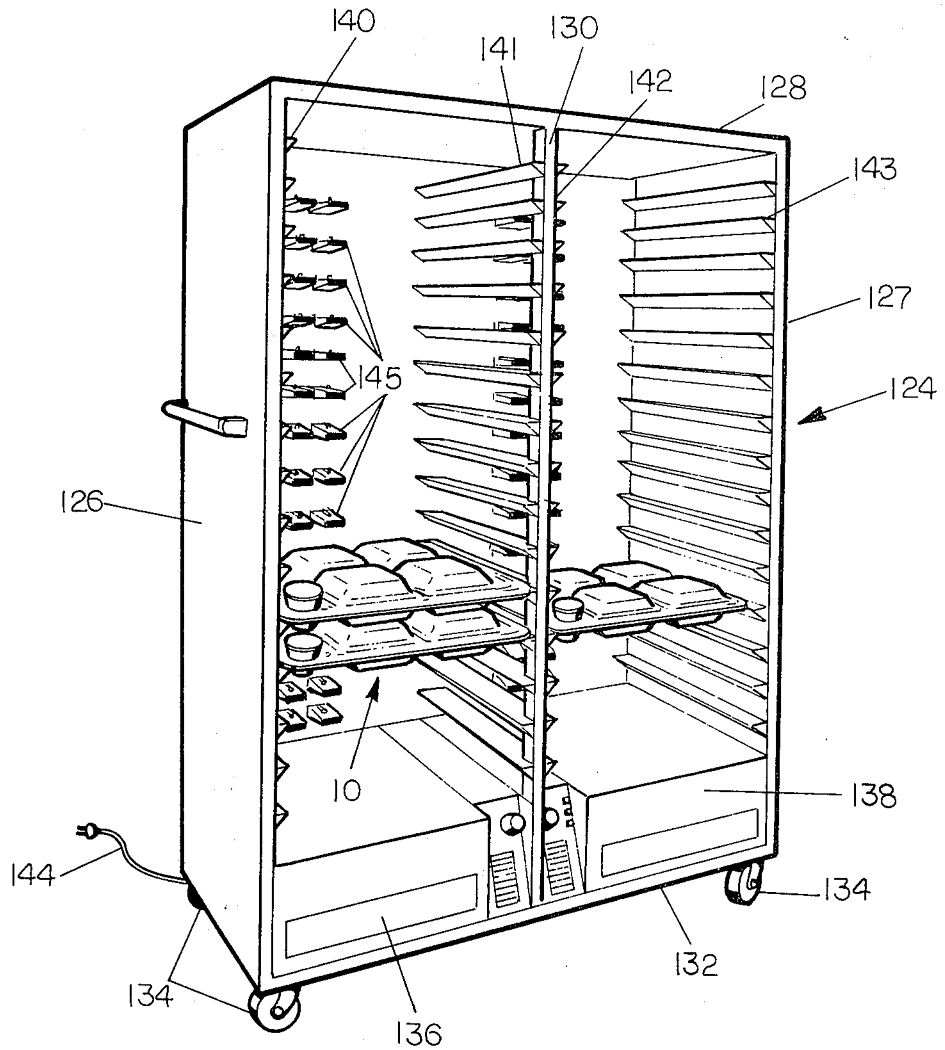
FIG. 10 is a perspective view of a mobile-holding cart utilizing the air flow and temperature control concepts of the present invention.

FIG. 10 illustrates an embodiment of this invention which, while conceptually similar, presents a somewhat different theory of utilization. The embodiment off the invention utilizing a separate transport cart 32 and meal-holding unit 54 locks the meal-holding unit 54 ito a particular location. Under some circumstances it may be desirable to provide greater mobility for the total holding unit and the embodiment of FIG. 10 achieves this goal. In FIG. 10, the transport cart 32 and meal-holding unit 54 have been combined into a single, mobile-holding cart 124. The mobile-holding cart 124 is basically a cabinet-type unit having sidewalls 126 and 127 and a top wall 128. In this particular case, the mobile-holding cart 124 is sized to hold two separate sets of trays 10 and there is therefore a center divider wall 130. The entire unit actually rests on a bottom wall 132 which is mounted on wheels or casters 134. In this situation, a heating unit 136 and a cooling unit 138 are mounted on top of the bottom wall 132 and actually form the lowermost portion of the mobile-holding cart 124. The basic manifolding arrangement may be any one of those shown in FIGS. 7, 8 or 9 to allow selective presentation of heated or cooled air to the trays 10 which are carried by the mobile-holding cart 124. The trays 10 are supported by their flanges 20 from triangularly shaped tray-support members 140 mounted on the sidewall 126, 141 mounted on the center divider 130, 142 mounted on the opposite side of the center divider 130 and 143 mounted on the sidewall 127. This is simply an illustration of another possible configuration for the tray holders as opposed to the channel-shaped configuration shown with respect to tray-support members 48 and 50. As was the case with the transport cart 32 and meal-holding unit 54, combination, a plurality of nozzles 145 are mounted at the rear portion of the mobile-holding cart 124. All the nozzles in FIG. 10 are given the same reference numeral of 145, but the split of nozzles or the connection to the manifold may be identical with that illustrated with respect to FIGS. 3 and 4. That is, there are two nozzles provided for each of the compartments 12 and 14 for the trays 10, and the connection to the heating unit 136 and cooling unit 138 may be selectively made to hold a complete meal at a proper cool temperature for a period of time and then heat a portion of the meal to serving temperature. The significant advantage presented by the mobile-holding cart 124 is that it may be rolled or moved to a location where it is needed and then plugged into a conventional wall outlet with an electrical cord 144 which will then power the heating and cooling units 136 and 138. This system then does away with the relative inflexibility of having the meal-holding unit 54 at a fixed location and allows rerouting for changes in the needs of meal service.

What I claim is:

1. A temperature control system for the contents of the compartments of a two-compartment tray which comprises, in combination:

means for supporting said trays in a uniform vertical array;

an enclosure for said array of trays;

refrigeration means for cooling a flow of gas passing therethrough to present a flow of refrigerated gas;

heating means for heating a flow of gas passing therethrough to present a flow of heated gas;

a flow distributor, mounted in said enclosure, having a first inlet manifold and a first outlet manifold connected to said refrigeration means and a second inlet manifold and a second outlet manifold;

a plurality of nozzles, in communication with said first and second inlet manifolds and said first and second outlet manifolds, for engagement with the compartments of said trays, said nozzles being positioned to allow one nozzle in communication with said first inlet manifold, and one nozzle in communication with said first outlet manifold to engage one compartment of each of said trays and one nozzle in communication with said second inlet manifold and one nozzle in communication with said second outlet manifold to engage the second compartment of each of said trays; and flow control means, connected to said flow distributor, for selectively connecting either said refrigeration means or said heating means to said second inlet and outlet manifolds.

2. The system of claim 1 which further includes:

valve means for closing the communication between said nozzles and said manifolds when a tray is not presented to said nozzles.

3. The system of claim 2 wherein the communication between said manifolds and said nozzles is provided by openings cut in said manifolds in alignment with said nozzles and wherein said valve means comprises:

a flapper valve covering said opening in said manifold;

spring means for biasing said flapper valve into a normally closed position; and a push rod positioned adjacent said nozzle and in contact with said flapper valve, said push rod extending to a position to be contacted and moved by a tray as said tray is engaged by said nozzle, whereby movement of said push rod will overcome the bias of said flapper valve to open said flapper valve.

4. The system of claim 1 wherein said flow control means includes:

a first cross-connecting duct in communication with said first and second inlet manifolds;

a selectively closeable valve connected in said first cross-connecting duct;

a second cross-connecting duct in communication with said first and second outlet manifolds; and a selectively closeable valve connected in said second cross-connecting duct.

5. The system of claim 1 wherein said means for supporting said trays includes:

a transport cart having sidewalls connected by a top portion and a base member;

a plurality of wheels attached to said base member; and a plurality of pairs of support members for said trays mounted on opposing sidewalls of said transport cart, said transport cart and said enclosure being relatively sized to allow entry of said transport cart completely into said enclosure.

6. The system of claim 1 wherein said enclosure for said array of trays is a cabinet-like unit having sidewalls connected by top and bottom walls and wherein said means for supporting said trays comprise pairs of support members mounted on opposing sidewalls of said cabinet-like unit, each pair of support members serving to hold a single tray.

7. The system of claim 6 further characterized in that said cabinet-like unit further includes a plurality of wheels mounted on said bottom wall to allow movement of said cabinet-like unit.

8. The system of claim 7 further characterized in that said refrigeration means and said heating means are carried by said cabinet-like unit.

9. The system of claim 1 wherein said refrigeration means and said heating means includes:

a separate refrigeration unit for each of said first and second inlet and outlet manifolds;

a separate blower for moving gas to and from said refrigeration units for each of said first and second inlet and outlet manifolds; and a heat source connected in series with the blower and refrigeration unit for said second inlet and outlet manifolds.

10. The system of claim 1 wherein said refrigeration means and said heating means include:

a refrigeration unit of the type wherein a working fluid is circulated through an evaporator to cool a gas passed over said evaporator, said refrigeration unit furnishing refrigerated gas to said first inlet manifold;

a blower for moving gas to and from said refrigeration unit;

an evaporator, supplied with working fluid from said refrigeration unit, for selectively furnishing refrigerated gas to said second inlet manifold;

a heat source, connected in series with said evaporator, for selectively furnishing heated gas to said second inlet manifold; and a blower for moving gas to and from said evaporator and said heat source.

11. The system of claim 10 wherein said flow control means includes:

a supply pipeline and a return pipeline connecting said evaporator with said refrigeration unit to transport working fluid; and a valve connected in one of said pipelines for selectively blocking the transfer of working fluid to said evaporator.

* * * * *